3,255,229
HALOGENATED ALKYL CHLOROSULFATES AND FLUOROSULFATES
Murray Hauptschein, Glenside, Pa., and Milton Braid, Haddon Heights, N.J., assignors to Pennsalt Chemicals Corporation, Philadelphia, Pa., a corporation of Pennsylvania
No Drawing. Filed Sept. 20, 1963, Ser. No. 310,479
8 Claims. (Cl. 260—456)

This application is a continuation-in-part of copending application Serial No. 735,702, now abandoned, filed May 16, 1958, for Halogenated Organic Compounds, by Murray Hauptschein and Milton Braid.

This invention relates to haloalkyl chlorosulfates and fluorosulfates of the general formula $RCX_2CHXOSO_2X$ where R is fluorine or a haloalkyl group which is at least one half halogenated (i.e., at least one half of the hydrogens of the corresponding alkyl radical are substitued by halogen); and where X represents chlorine, fluorine or both. Preferably R is a perfluoroalkyl, a perfluorochloroalkyl, a perfluorohydroalkyl or a perfluorochlorohydroalkyl radical. Where R is alkyl it preferably contains from 1 to 50 and most desiraby from 1 to 20 carbon atoms. As used herein, the term perfluoroalkyl means an alkyl radical containing only the elements carbon and fluorine. A perfluorochloroalkyl radical means one which contains only the elements chlorine, fluorine and carbon in which the ratio of fluorine to chlorine atoms is at least 1:1. A perfluorohydroalkyl radical means one which contains only the elements fluorine, hydrogen and carbon in which the ratio of fluorine to hydrogen atoms is at least 1:1. A perfluorochlorohydroalkyl radical means one which contains only the elements fluorine, chlorine, hydrogen and carbon and in which the ratio of chlorine plus fluorine atoms to hydrogen atoms is at least 1:1.

The new haloalkyl chlorosulfates and fluorosulfates of the invention are prepared by a new route involving the reaction of chlorosulfonic acid or fluosulfonic acid with a halogenated iodide of the formula $RCX_2CHXI$ where R and X are as defined above. In this reaction, the chlorosulfate ($OSO_2Cl$) or a fluorosulfate ($OSO_2F$) group replaces the iodine to form the corresponding halosulfate with the halosulfate group ($OSO_2X$) bonded to the carbon vacated by the iodine through an oxygen atom thus:

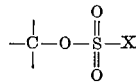

This reaction may be illustrated in the case of 2,2,2-trifluoro-1-chloro-1-iodoethane and chlorosulfonic acid by the following equation:

(1)
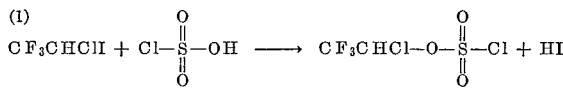

Iodine chlorides and sulfur dioxide are in general the inorganic products ultimately formed, probably as the result of the following reactions:

(2)          $ClSO_3H \rightleftharpoons SO_3 + HCl$
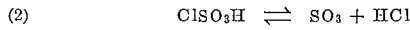
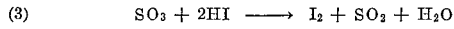
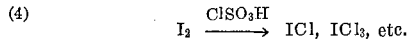

As will be shown in detail in the description which follows, the reaction of fluosulfonic or chlorosulfonic acid with these halogenated iodides produces the fluorosulfate or chlorosulfate, that is, compounds in which the sulfur of the fluosulfonic or chlorosulfonic acid is linked to a carbon atom through an oxygen atom

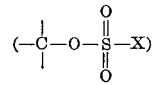

to the substantial exclusion of sulfonyl chlorides or fluorides

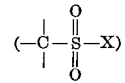

or sulfonic acids

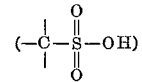

in which the sulfur of the chlorosulfonic group is linked directly to a carbon atom, and to the substantial exclusion also of sulfites

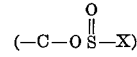

The stable haloalkyl chlorosulfates and fluorosulfates provided by the present invention are a valuable class of compounds. Because they are halosulfates, with the sulfur bonded to a halogenated carbon through an oxygen atom, rather than sulfonic acids in which the sulfur is bonded directly to the halogenated carbon, they undergo a unique hydrolysis reaction, which the corresponding hydrocarbon halosulfates do not undergo, to produce halogenated aldhydrols or aldehydes (an aldhydrol is the precursor hydrate of the aldehyde). This reaction, which is described more in detail in our co-pending application Serial No. 336,345, filed January 8, 1964, for Preparation of Halogenated Organic Compounds, may be illustrated in the case of the chlorosulfate $CF_3CHClOSO_2Cl$ by the following equation:

(5)
$CF_3CHClOSO_2Cl + 3HOH \longrightarrow CF_3CH(OH)_2 + H_2SO_4 + 2HCl$ (6)
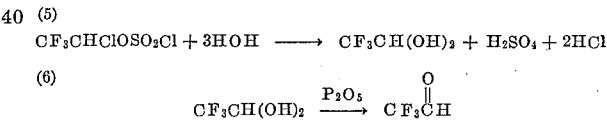

The haloalkylchlorosulfates and fluorosulfates of the invention are thus valuable stable intermediates for the preparation of valuable halogenated aldehydes, many of which are difficult to prepare by other methods.

Of particular value are halosulfates of the formula $RCX_2CHXOSO_2X$ where R is a perhalogenated highly fluorinated alkyl radical such as a perfluoroalkyl or a perfluorochoroalkyl radical.

An especially valuable class of compounds are halosulfates of the formula $R_fCF_2CHXOSO_2X$ where $R_f$ is a perfluoroalkyl radical, preferably having from about 4 to 14 carbon atoms. From such halosulfates, perfluoroalkyl aldhydrols and aldehydes may be readily prepared. The perfluorinated aldhydrols and aldehydes wherein $R_f$ is a relatively long chain perfluoroalkyl group (at least 4 carbons in length) have valuable surface properties due to the extremely low surface energy of the perfluoroalkyl "tail." By virtue of such properties, the perfluorinated aldehydes and aldhydrols that may be prepared from the halosulfates of the invention are useful, e.g., as intermediates for the preparation of resins in which the relatively long perfluoroalkyl "tails" provide a high degree of water and oil repellency when such resins are used to impregnate or coat fabrics, leather, paper or other materials.

While the precursor halogenated iodides used to prepare the halosulfates of the invention may be obtained by any desired procedure, one convenient way to prepare the precursor iodides, particularly those having relatively long carbon chains is by so-called telomerization techniques wherein a short chain halogenated alkyl iodide is reacted with a haloethylene such as $CF_2=CHCl$ or $CF_2=CHF$ to produce telomer iodides, e.g., of the formula:

$$R[CF_2CHCl]_nI$$

$$R[CF_2CHF]_nI$$

where R is a haloalkyl radical which is at least half halogenated and is preferably a perfluoroalkyl, perfluorochloroalkyl, perfluorohydroalkyl or perfluorochlorohydroalkyl radical having from about 1 to 15 carbon atoms, and where $n$ is an integer from about 1 to 30 and preferably from 1 to about 10. Any known telomerization procedure may be used to prepare such telomer iodides. For example, the preparation of telomer iodides of the formula $R[CF_2CHCl]_nI$ is described in U.S. Patent 3,051,764 of Murray Hauptschein and Milton Braid. Using similar procedures, telomer iodides of the formula $R[CF_2CHF]_nI$ may also be prepared.

The following are specific examples of typical chlorosulfates and fluorosulfates provided by the invention:

$CF_2ClCHClOSO_2Cl$   $CF_3CF_2CHClOSO_2F$
$CF_2ClCHClOSO_2F$   $CF_2ClCFClCF_2CHClOSO_2Cl$
$CF_3CHClOSO_2Cl$    $CF_2ClCFCl[CF_2CHCl]_3OSO_2Cl$
$CF_3CHFOSO_2Cl$     $CF_3CF_2CF_2CF_2CHClOSO_2Cl$ $$CF_3CF[CF_2CF_2]_3CF_2CHClOSO_2Cl\ \ \ \text{(with } CF_3 \text{ branch)}$$

$$CF_3CF[CF_2CF_2]_4CF_2CHClOSO_2Cl\ \ \ \text{(with } CF_2Cl \text{ branch)}$$

$C_3F_7[CF_2CHCl]_3OSO_2Cl$
$CF_3CF_2CF_2CHFOSO_2F$
$CF_3[CF_2CHF]_3OSO_2Cl$

In the preparation of the compounds of the invention by the reaction of corresponding halogenated iodides with chlorosulfonic or fluorosulfonic acid, the reaction will be carried out at temperatures ranging from about $+20°$ C. to $+300°$ C. and preferably in the range of from about $40°$ C. to $250°$ C. The optimum temperature of reaction will be determined by the optimum balance between the temperatures that give reasonable rates of reaction and conversions and those which give the best yield of desired halosulfate. Generally, the reaction of the iodide with chlorosulfonic acid proceeds more readily at a given temperature than with fluosulfonic acid. Thus, the optimum temperature to form the fluorosulfate may range from $10°$ C. to $100°$ C. higher than that found optimum for the chlorosulfate.

The reaction pressure is not critical. Thus, the reaction may be carried out most conveniently at atmospheric pressure. However, if desired it can be conducted under slight vacuum, or under any practical pressures ranging for example, up to 50,000 pounds per square inch.

The reaction time is likewise not critical. Reaction periods ranging from several minutes to several days may be used, although in the majority of cases, reaction periods of from 2 to about 15 hours will be found satisfactory.

The molar ratio of the chlorosulfonic or fluosulfonic acid to the iodide is not critical but should generally be in the range of from 1:1 to 20:1 and preferably in the range of about 2:1 to 10:1. Molar ratios of the chlorosulfonic or fluorosulfonic acid to iodide of less than 1:1 are wasteful of the starting iodide. An excess of the halosulfonic acid is preferable to insure complete reaction of the iodide.

To carry out the reaction, the halosulfonic acid and the starting iodide can be mixed together and then heated to the reaction temperature. In these cases, however, it will be preferred to add the iodide slowly to an excess of the halosulfonic acid maintained at the desired reaction temperature.

The reaction may be conducted with or without a solvent. In general no solvent is required, although if desired halogenated solvents may be present.

Since some of the reactants, particularly the halosulfonic acids, and some of the reaction products, are corrosive, it is often preferable to conduct the reaction in glass or glass lined equipment or in metal equipment which is resistant to the corrosive influence of the reagents employed.

Since it is usually preferable to employ an excess of the halosulfonic acid, the reaction product will generally contain unreacted chlorosulfonic or fluosulfonic acid. The halosulfate may be separated from the halosulfonic acid by pouring the reaction mixture over crushed ice or into water held at $0°$ C. The halosulfonic acids being soluble in water will dissolve in the water and the halosulfates, being generally water insoluble, will separate as the lower organic layer. Use of low temperatures to effect this separation is important both from the standpoint of avoiding excessive heating when the halosulfonic acid dissolves in water, and to avoid hydrolysis of the halosulfate. In some cases, if the halosulfate boils at a sufficiently different temperature from the corresponding halosulfonic acid, it can be removed from the mixture without water washing by a simple distillation, although this procedure is not usually preferred. Iodine which is also usually formed in the reaction can be removed from the halosulfate by filtration, by selective solvent extraction, or other well known techniques.

In many cases the separation of the crude halosulfate from excess halosulfonic acid may be accomplished simply by permitting the reaction mixture to stand, whereupon it separates into two phases, an organic phase containing the crude halosulfate, and an inorganic phase containing mostly unreacted halosulfonic acid, after which the halosulfate may be recovered by simple decantation.

The crude halosulfate, after separation from the excess halosulfonic acid as described may be further purified by distillation or other well known techniques.

*Example 1.—Reaction of 1,2-dichloro-1-iodo-2,2-difluoroethane with chlorosulfonic acid*

To 25 grams (0.214 mole) of chlorosulfonic acid heated at $60°$ to $65°$ C. there is added drop by drop during fifteen minutes 10 grams (0.0383 mole) of $CF_2ClCHClI$ while stirring. [The latter compound is prepared by reaction of iodine chloride (ICl) with the olefin $CF_2=CHCl$ at a temperature of about $40°$ C. in an autoclave at autogeneous pressure.] The reaction mixture is stirred for 1 hour at 80 to $85°$ C. and, finally, at $90°$ C. for 2.5 hours. After rapid hydrolysis of the reaction mixture by pouring onto chipped ice, the lower liquid layer is separated and dried with anhydrous calcium sulfate. Upon distillation of the latter liquid, 5 grams of the chlorosulfate $CF_2ClCHClOSO_2Cl$ is collected, the middle cut boiling at $78°$ to $79°$ C. at 5 mm. Hg, and having a refractive index $n_D^{25}$ 1.418. The infra-red spectrum of this compound shows the characteristic chlorosulfate band at $6.9\mu$ and has the following analysis:

Calculated for: $C_2HO_3Cl_3F_2S$: C, 9.6; H, 0.40; Cl, 42.6; S, 12.9. Found: C, 10.6; H, 0.57; Cl, 42.3; S, 12.2.

*Example 2.—Reaction of 1-chloro-2,2,2-trifluoro-iodoethane with chlorosulfonic acid*

Following the procedures of Example 1, the iodide $CF_3CHClI$ (prepared by the addition of iodine monofluoride to the olefin $CF_2=CHCl$ as described in Patent No. 3,006,973) is reacted with a ten fold molar excess of chlorosulfonic acid at $70°$ C. for 3 hours. After separation of the organic product from excess chlorosulfonic acid there is obtained a good yield of the chlorosulfate $CF_3CHClOSO_2Cl$, a colorless liquid.

*Example 3.—Reaction of 1,2,2,2-tetrafluoro-1-iodoethane with chlorosulfonic acid*

Following the procedures of Example 1, the iodide $CF_3CHFI$ (prepared by the addition of iodine monofluoride to the olefin $CF_2=CHF$ as described in United States Patent No. 3,006,973) is reacted with a molar excess of chlorosulfonic acid at 130° C. for 5 hours. There is obtained a good yield of the chlorosulfate $CF_3CHFOSO_2Cl$, a colorless liquid.

*Example 4.—Reaction of 1-chloro-2,2,2-trifluoro-iodoethane with fluorosulfonic acid*

To 20 grams of fluosulfonic acid heated to a temperature of 100° C. there is added dropwise over a period of one-half hour 5 grams of the iodide $CF_3CHClI$. The reaction mixture is stirred with heating for 4 hours at 125° C. The mixture is cooled and then poured rapidly over chipped ice; the lower liquid layer is separated and dried with anhydrous calcium sulfate. Upon distillation there is obtained the fluorosulfate $CF_3CHClOSO_2F$, a colorless liquid.

*Example 5.—Reaction of 1-chloro-1-iodo-nonafluoropentane with fluorosulfonic acid*

The iodide $CF_3CF_2CF_2CF_2CHClI$ is obtained by the reaction of the perfluoroalkyl iodide $CF_3CF_2CF_2I$ with the olefin $CF_2=CHCl$ according to the procedures described in U.S. Patent 3,051,764. About 5 grams of the iodide is added slowly to a 10 fold molar excess of fluosulfonic acid while maintaining the mixture at a temperature of 90° C. with stirring. Stirring and heating at this temperature is continued for a period of 2 hours after which the reaction mixture is poured rapidly over chipped ice. The lower liquid layer is separated and dried with anhydrous calcium sulfate. Upon distillation there is obtained a good yield of the fluorosulfate $$CF_3CF_2CF_2CF_2CHClOSO_2F$$

a colorless liquid.

*Example 6.—Reaction of $CF_2ClCHCl[CF_2CHCl]_4$ av * I with chlorosulfonic acid*

The above telomer iodide mixture (prepared according to the procedure described in United States Patent No. 3,051,764) is reacted with a 10 fold molar excess of chlorosulfonic acid at a temperature of 75° C. for 6 hours. There is obtained from this reaction a good yield of a mixture of chlorosulfates of the formula $$CF_2ClCHCl[CF_2CHCl]_{4av}OSO_2Cl$$

*Example 7.—Reaction of*

*with chlorosulfonic acid*

The iodide

is prepared by the reaction of the perfluoroalkyl iodide

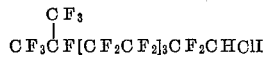

with the olefin $CF_2=CHCl$ according to the procedures described in U.S. Patent 3,051,764. About 10 grams of that iodide is mixed with a 10 fold molar excess of chlorosulfonic acid and the mixture heated with stirring at a temperature of 90° C. for 5 hours. The mixture is then permitted to cool and separates into two layers. The lower

*av denotes "average" indicating a mixture of telomers in which the average number of 1,1-difluoro-2-chloroethylene ($CF_2CHCl$) units is 4.

layer which is separated from the upper layer of chlorosulfonic acid in a separatory funnel consists of the chlorosulfate

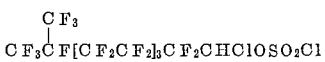

*Example 8.—Reaction of*

*with chlorosulfonic acid*

The iodide

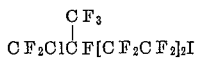

is prepared by the reaction of the iodide

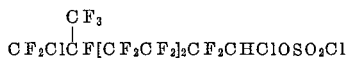

with the olefin $CF_2=CHCl$ according to the procedures described in U.S. Patent 3,051,764. Following the procedures of the previous example, about 10 grams of the above iodide is reacted with a ten fold molar excess of chlorosulfonic acid and there is obtained a good yield of the chlorosulfate

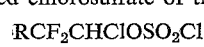

We claim:

1. A halogenated halosulfate of the formula $$RCX_2CHXOSO_2X$$

where R is selected from the class consisting of fluorine and haloalkyl containing up to 50 carbon atoms which are at least half halogenated with a halogen selected from the group of chlorine and fluorine and where X is selected from the class consisting of fluorine and chlorine.

2. A halogenated halosulfate in accordance with claim 1 in which R is perfluoroalkyl.

3. A halogenated halosulfate in accordance with claim 1 in which R is perfluorochloroalkyl.

4. A halogenated halosulfate in accordance with claim 1 in which R is perfluorohydroalkyl.

5. A halosulfate in accordance with claim 1 in which R is perfluorochlorohydroalkyl.

6. A halogenated chlorosulfate of the formula $$RCF_2CHClOSO_2Cl$$

where R is selected from the class consisting of fluorine and haloalkyl containing up to 50 carbon atoms which are at least half halogenated with a halogen selected from the group of chlorine and fluorine.

7. A halogenated halosulfate of the formula $$R_fCF_2CHXOSO_2X$$

where $R_f$ is perfluoroalkyl containing up to 50 carbon atoms and where X is selected from the class consisting of fluorine and chlorine.

8. A halogenated halosulfate in accordance with claim 7 in which $R_f$ contains from 4 to 14 carbon atoms.

References Cited by the Examiner

UNITED STATES PATENTS

| | | | |
|---|---|---|---|
| 2,628,972 | 2/1953 | Calfee et al. | 260—456 |
| 2,878,156 | 3/1959 | Davis | 260—456 |

CHARLES B. PARKER, *Primary Examiner.*